(12) United States Patent
Deng et al.

(10) Patent No.: US 10,897,180 B2
(45) Date of Patent: Jan. 19, 2021

(54) VOICE COIL ACTUATOR DIRECT-DRIVE RESONANT SYSTEM

(71) Applicant: PURDUE RESEARCH FOUNDATION, West Lafayette, IN (US)

(72) Inventors: Xinyan Deng, Lafayette, IN (US); Jian Zhang, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 435 days.

(21) Appl. No.: 14/969,171

(22) Filed: Dec. 15, 2015

(65) Prior Publication Data
US 2017/0040865 A1 Feb. 9, 2017

Related U.S. Application Data

(60) Provisional application No. 62/091,796, filed on Dec. 15, 2014.

(51) Int. Cl.
| | |
|---|---|
| *H02K 7/06* | (2006.01) |
| *H02K 1/17* | (2006.01) |
| *H02K 1/22* | (2006.01) |
| *H02K 33/18* | (2006.01) |

(52) U.S. Cl.
CPC ............... *H02K 7/06* (2013.01); *H02K 1/17* (2013.01); *H02K 1/22* (2013.01); *H02K 33/18* (2013.01)

(58) Field of Classification Search
CPC ............ H02K 7/06; H02K 33/18; H02K 1/18; H02K 1/182; H02K 21/24; H02K 21/26; H02K 21/28
USPC ............................................................ 310/26
See application file for complete search history.

(56) References Cited

U.S. PATENT DOCUMENTS

| | | | | | |
|---|---|---|---|---|---|
| 4,995,658 | A | * | 2/1991 | Shiraki | ............... E05B 47/0012 292/201 |
| 5,793,133 | A | * | 8/1998 | Shiraki | .................... G08B 6/00 310/179 |
| 6,707,207 | B1 | * | 3/2004 | Khanna | ................ G11B 5/4813 310/156.32 |
| 2004/0195436 | A1 | * | 10/2004 | Sinclair | ................ A63H 27/008 244/49 |
| 2012/0264341 | A1 | * | 10/2012 | Mimlitch, III | ......... A63H 23/04 440/13 |
| 2013/0214631 | A1 | * | 8/2013 | Smith | .................. H02K 1/2766 310/156.07 |
| 2013/0342296 | A1 | * | 12/2013 | Li | .......................... H02K 26/00 335/220 |

* cited by examiner

*Primary Examiner* — Terrance L Kenerly
(74) *Attorney, Agent, or Firm* — Purdue Research Foundation

(57) ABSTRACT

Disclosed herein is a voice coil actuator direct-drive resonant flapper system for flapping wing micro air vehicles and flapping fin autonomous underwater vehicles.

30 Claims, 10 Drawing Sheets

VOICE COIL ACTUATOR DIRECT-DRIVE RESONANT SYSTEM

STATEMENT OF GOVERNMENT INTEREST

The present U.S. patent application is related to and claims the priority benefit of U.S. Provisional Patent Application Ser. No. 62/091,796, filed Dec. 15, 2014, the contents of which is hereby incorporated by reference in its entirety into this disclosure.

STATEMENT OF GOVERNMENT INTEREST

This invention was made with government support under 1100764-CMMI awarded by the National Science Foundation, and FA9550-11-1-0058 awarded by the United States Air Force. The government has certain rights in the invention.

TECHNICAL FIELD

The present disclosure generally relates to a voice coil actuator, and in particular to a voice coil actuator direct-drive resonant flapper system for flapping wing micro air vehicles, legged land vehicles, and flapping fin autonomous underwater vehicles.

BACKGROUND

This section introduces aspects that may help facilitate a better understanding of the disclosure. Accordingly, these statements are to be read in this light and are not to be understood as admissions about what is or is not prior art.

For flapping-wing Micro Air vehicles, legged land vehicles, and flapping fin autonomous underwater vehicles, the technologies for actuating of force/torque/thrust-generating appendages can be divided into two main categories: motor driven linkage and piezoelectric cantilever mechanisms. The latter has been proven to be effective as a flapping actuator at sub-gram scale because of its high power density at high frequencies (using high voltage) and low transmission losses. Motor driven actuators are successful at larger scales, operating at high efficiency and generating large output angles with low drive voltage. Linkage mechanisms are commonly used to transform rotational motion from the motor to reciprocal motion of the wings, which ensures the motor to operate at its efficient speed. However, they are also subjected to limitations such as fixed output kinematics without additional mechanisms, asymmetry in the kinematics without additional variable speed control, parasite structural vibration due to asymmetric acceleration and the linkage system operating at high frequency, and no elastic component in the system to preserve wing kinetic energy and therefore lower the efficiency. In the ideal scenario, with elastic components and system resonance, the kinetic and potential energy of the mechanical components in the system are conserved, and therefore, all the power is spent on the non-conservative energy cost, such as friction, damping of the system, the fluid-dynamic damping and/or ground reacting force acting on the appendages. There is therefore an unmet need for alternate systems and vehicles that offer less noise, higher efficiency, and superior maneuverability and response over traditional fixed wing or rotorcraft air vehicles, wheeled land vehicles, and rotary propeller under water vehicles.

SUMMARY

In one aspect, an actuator is presented. The actuator includes a stator that includes at least one yoke, at least one permanent magnet, wherein the at least one permanent magnet is coupled to the stator, at least one rotor, the rotor comprises at least one coil winding, wherein the rotor is moving within the magnetic field(s) generated by the permanent magnets, at least one appendage, wherein the at least one appendage is coupled to the rotor, and an optional spring element, wherein the spring element is coupled between the rotor and the stator.

In another aspect, a vehicle system is presented. The vehicle system includes a navigation system, a battery and power system, an actuator system, wherein the actuator system includes a stator comprising at least one yoke, at least one permanent magnet, wherein the at least one permanent magnet is coupled to the stator, at least one rotor, wherein the rotor comprises at least one coil winding, and wherein the rotor is moving within the magnetic field(s) generated by the permanent magnets, at least one appendage, wherein the at least one appendage is coupled to the rotor, and an optional spring element, wherein the spring element is coupled between the rotor and the stator, at least one sensor for navigation, and at least one sensor for acquiring information from surroundings.

DETAILED DESCRIPTION

Figure 1A:
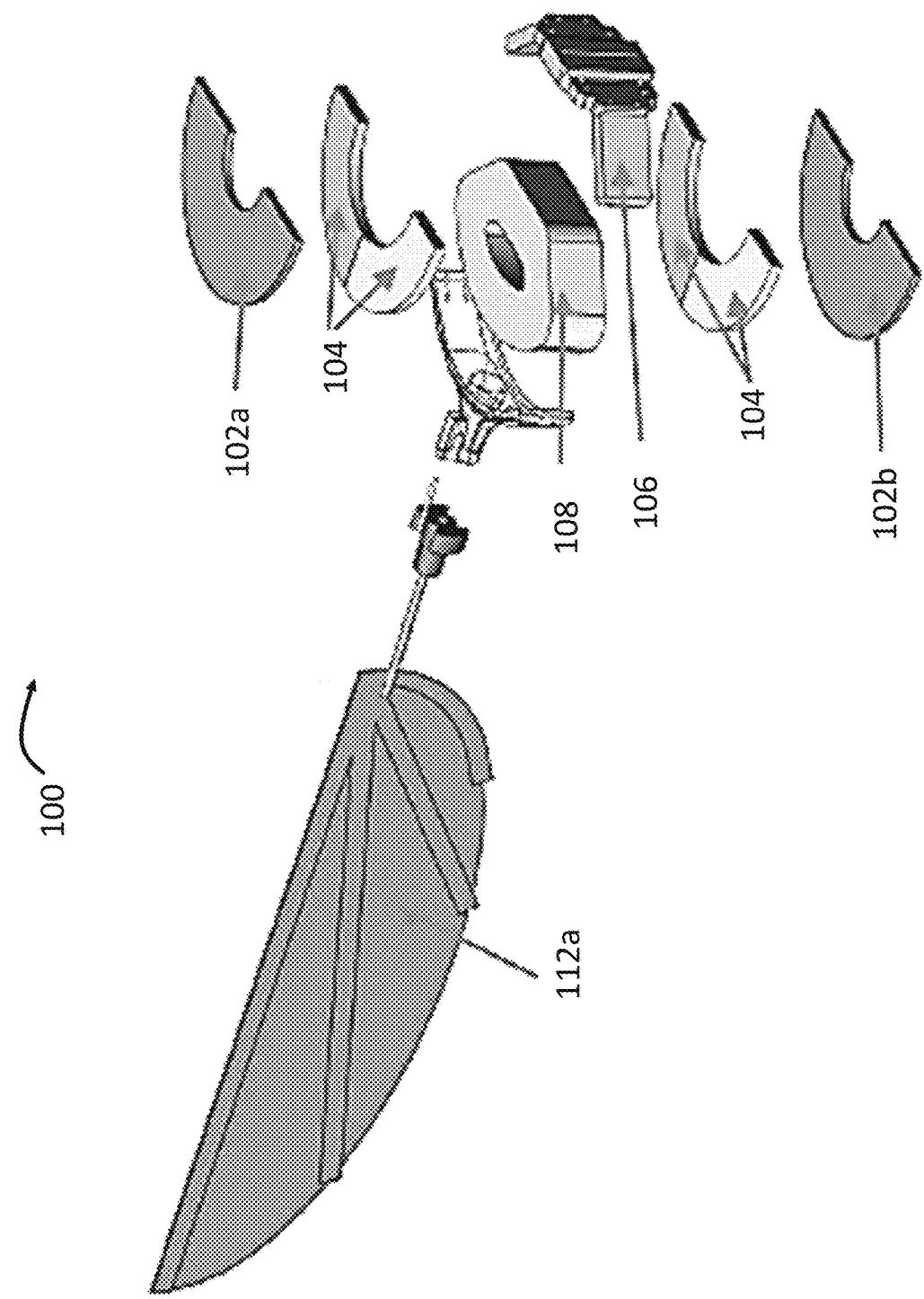
FIG. 1A shows an embodiment of the herein described device and system.
Figure 1B:
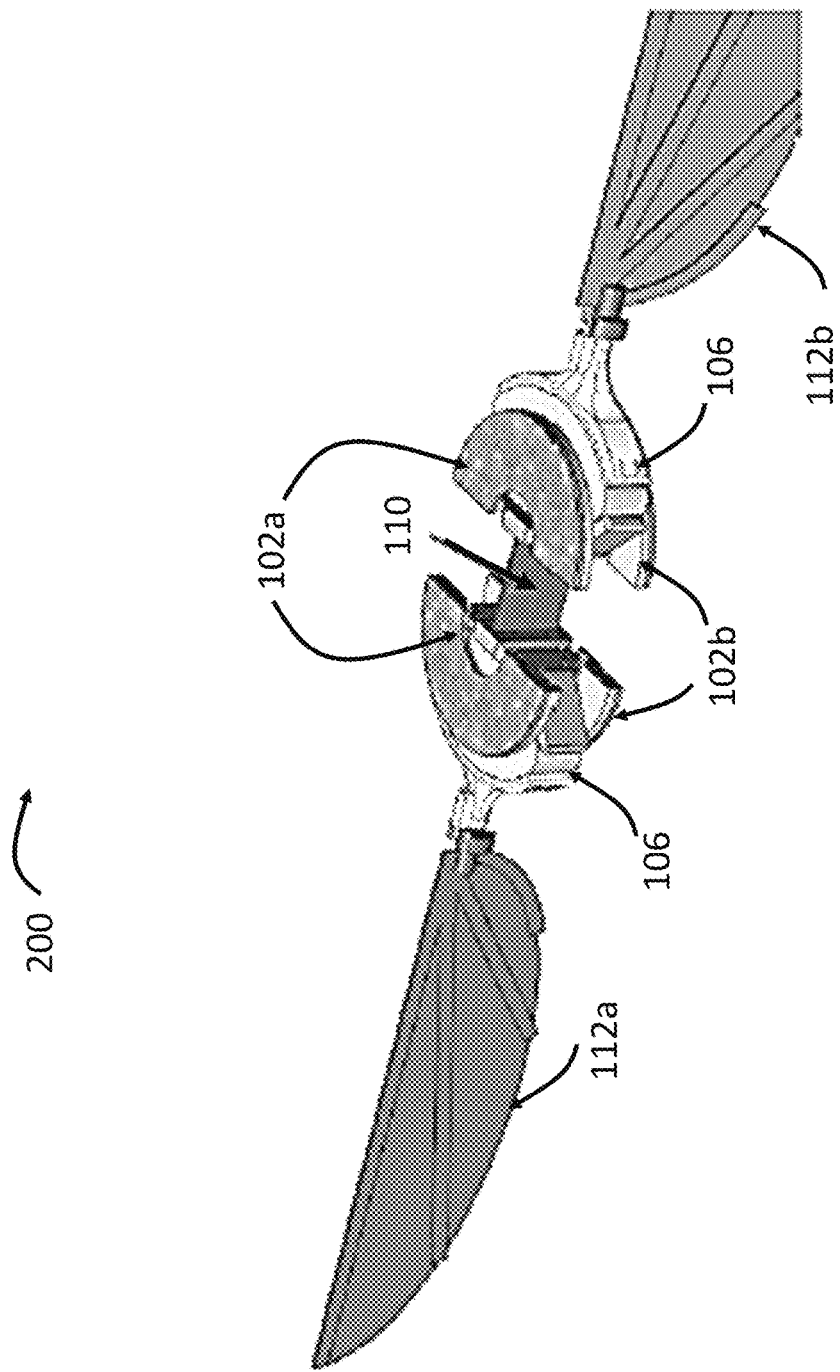
FIG. 1B shows an embodiment of the herein described device and system that is a more fully assembled device of that seen in FIG. 1A.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

A resonant direct-drive flapping appendage (wing/fin/limb) voice coil flapper is disclosed herein. This resonant direct-drive flapping wing/fin voice coil flapper is designed for versatile use in both Flapping Wing Micro Air Vehicles (MAV), Flapping Fin Autonomous Underwater Vehicle (AUV), and legged ground vehicle. The resonant direct-drive flapping appendage (wing/fin/limb) voice coil flapper is a synergetic integration of novel voice coil motor, spring energy storage element, and appendage (wing/fin/limb) subsystem.

Figure 2A:
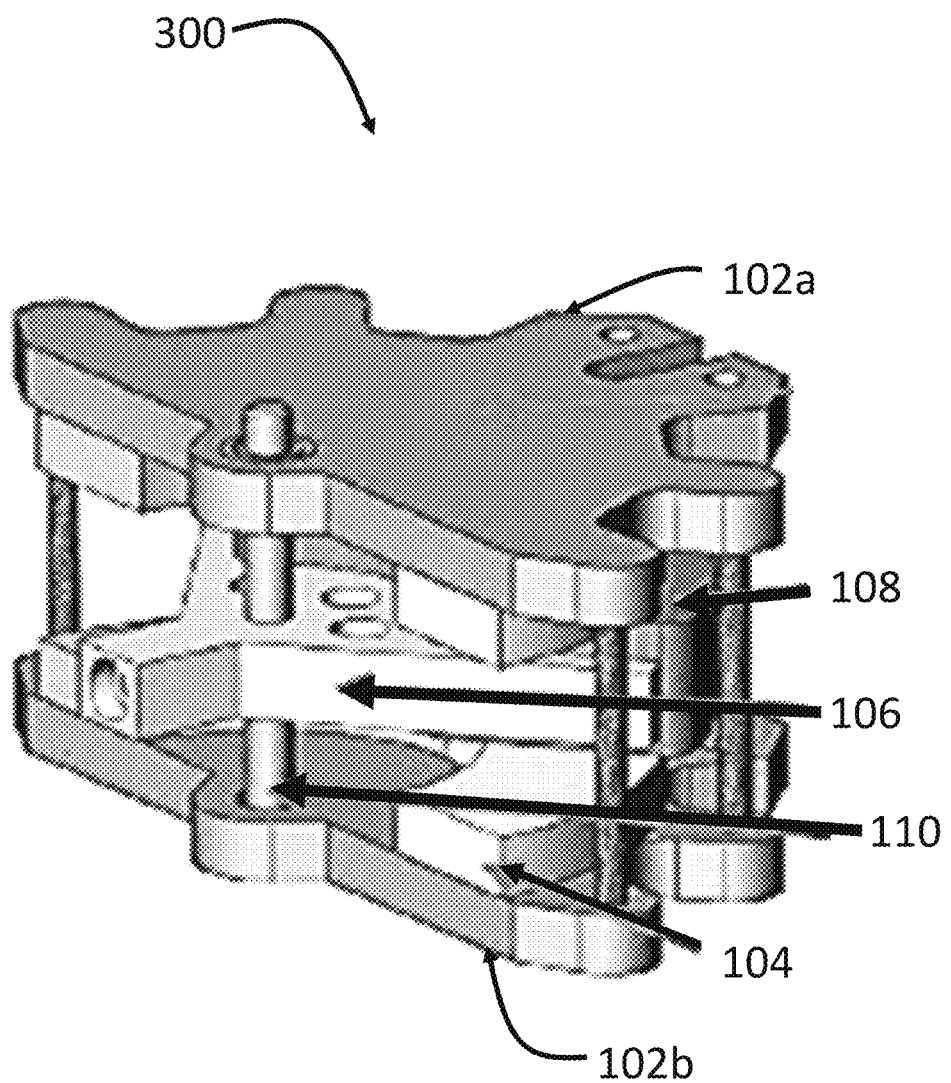
FIG. 2A is an embodiment of the herein described device and system.
Figure 2B:
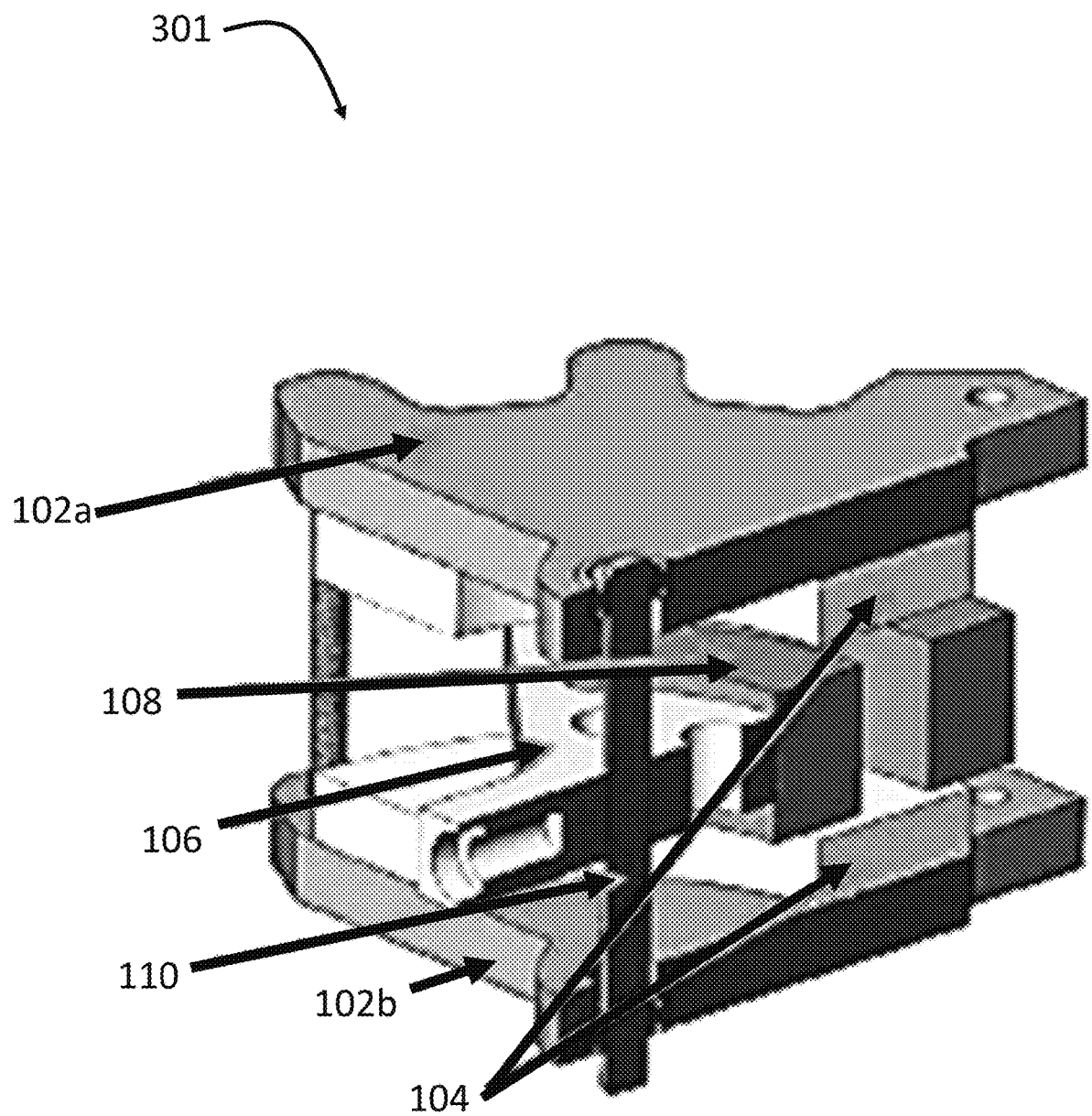
FIG. 2B is a cross-sectional view of the embodiment shown in FIG. 2A.
Figure 3:
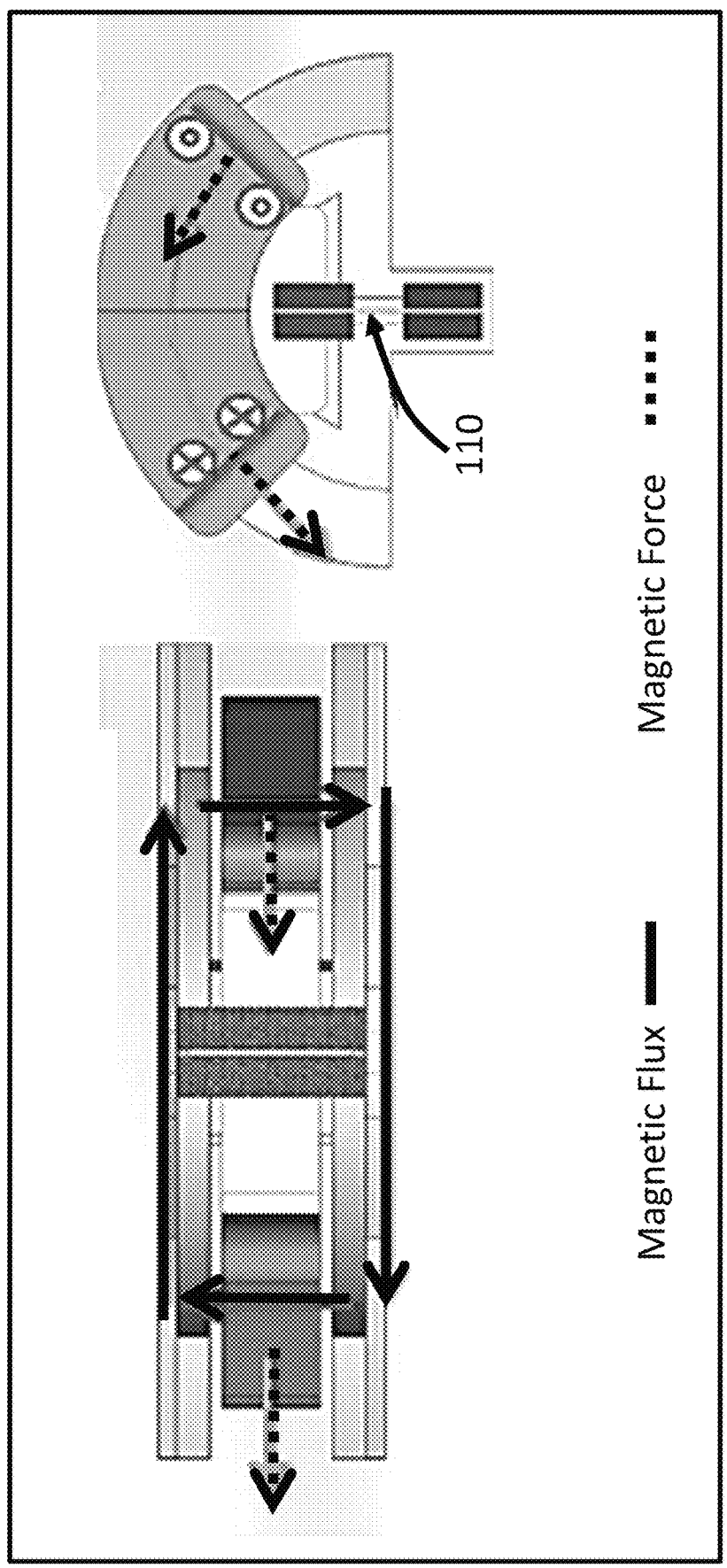
FIG. 3 includes images demonstrating that the magnets can be arranged in such a way to let the magnetic flux flow in the pattern as shown in FIG. 3 left image, thus when a potential difference is applied across the leads of the coil, the magnetic forces are shown in FIG. 3 right image with an arrow showing a driving torque generated acting upon the rotor to flap the appendage in one direction.
Figure 4:
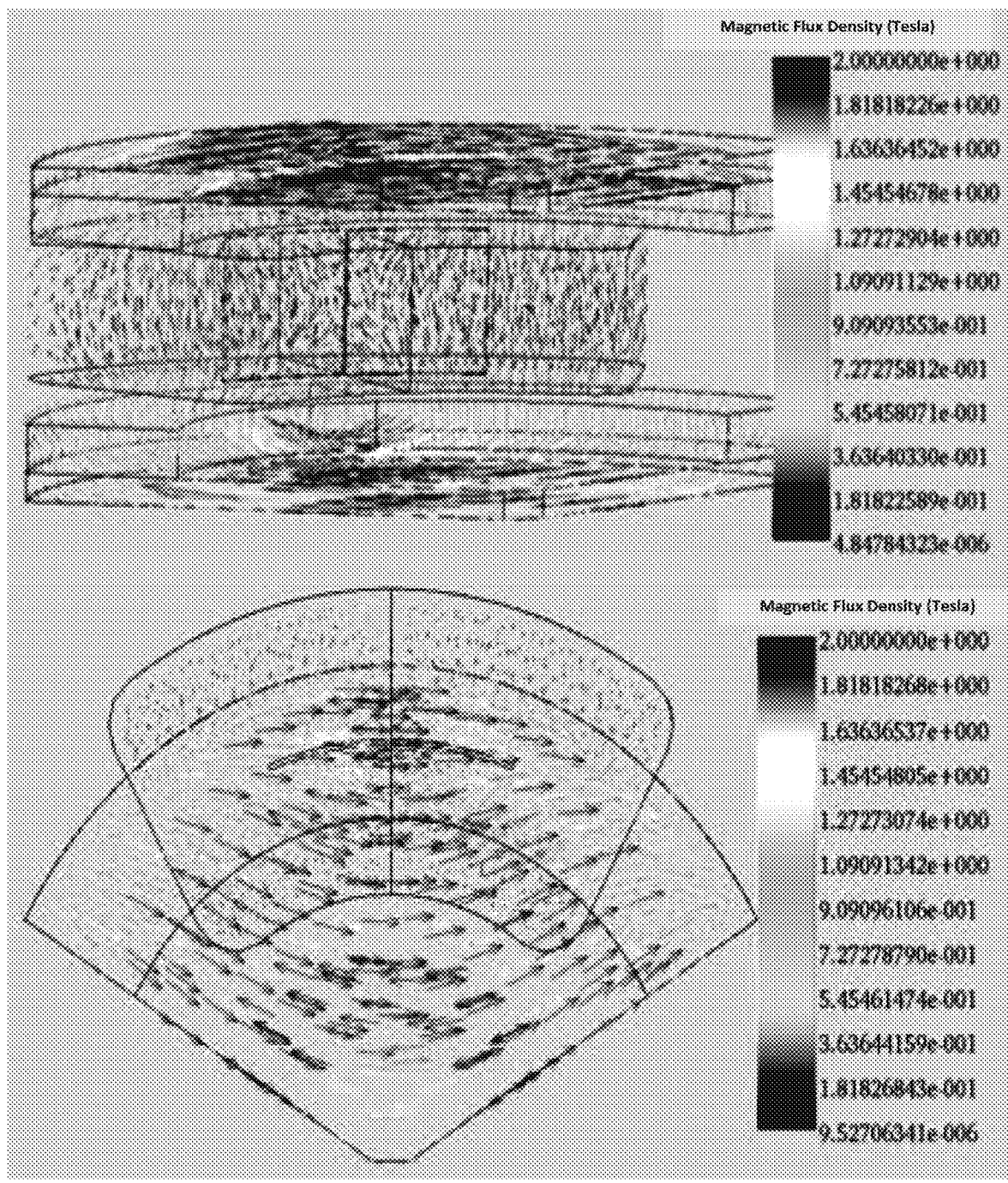
FIG. 4 shows results of a finite element magnetic simulation for a magnetic circuit design showing the flux direction generated by the magnet polarity arrangement.
Figure 5:
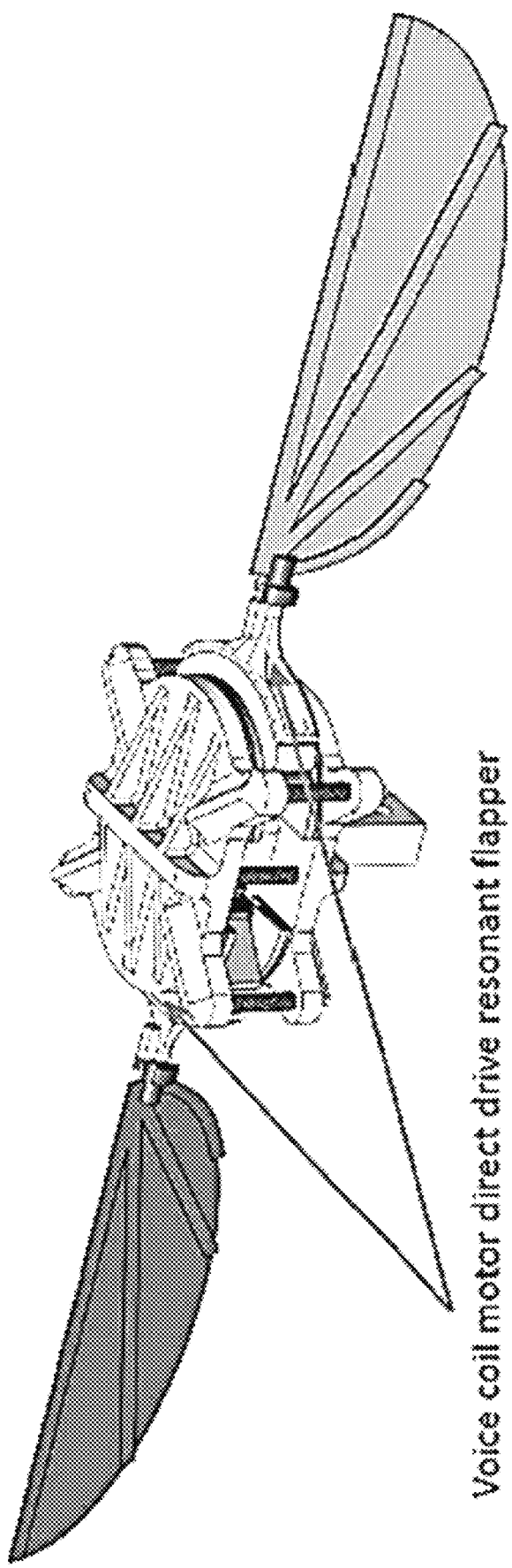
FIG. 5 shows an embodiment of the present disclosure in Flapping Wing Micro Air Vehicles.
Figure 6:
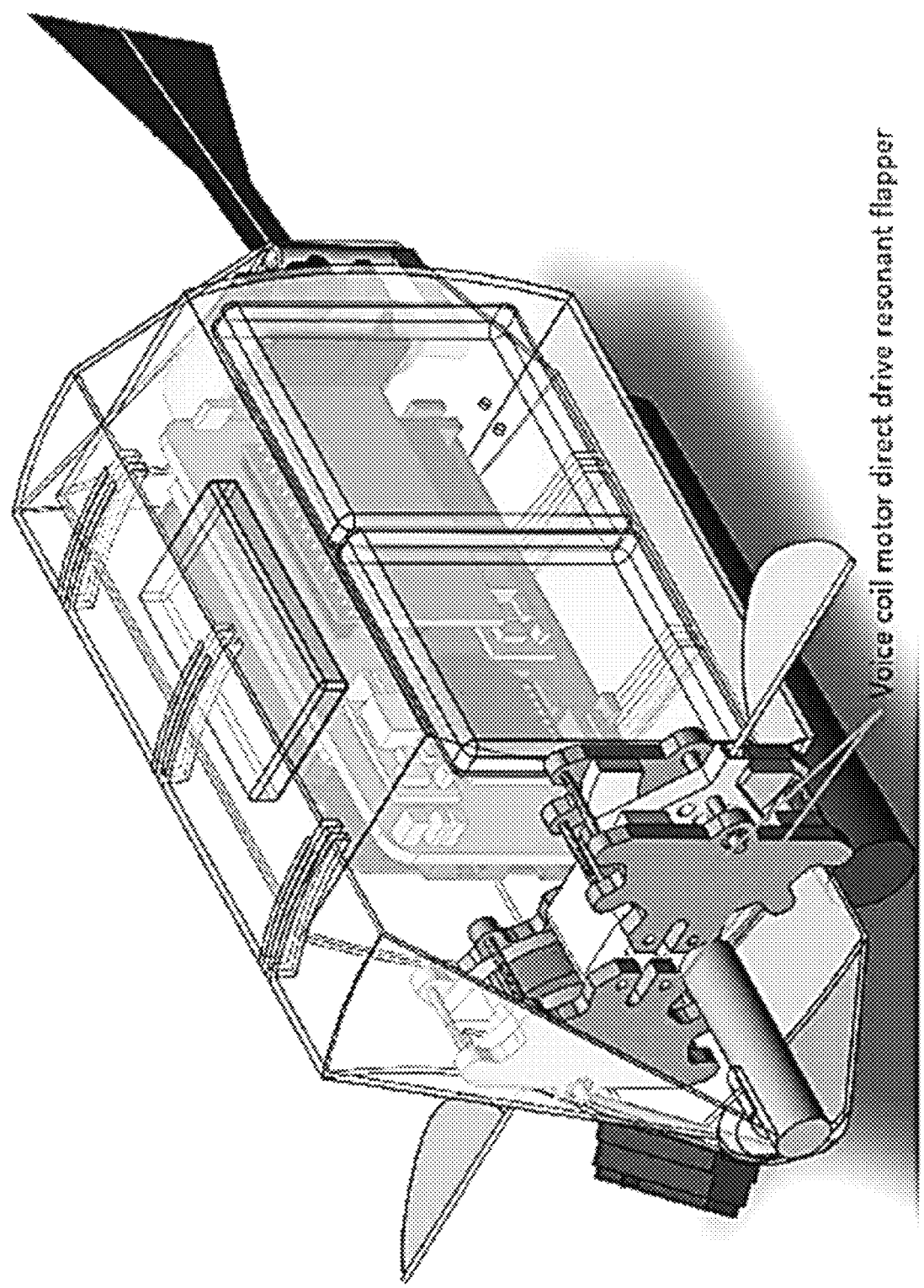
FIG. 6 shows another embodiment of the present disclosure in Flapping Fin Autonomous Underwater Vehicle with pectoral and tail fin actuated.
Figure 7:
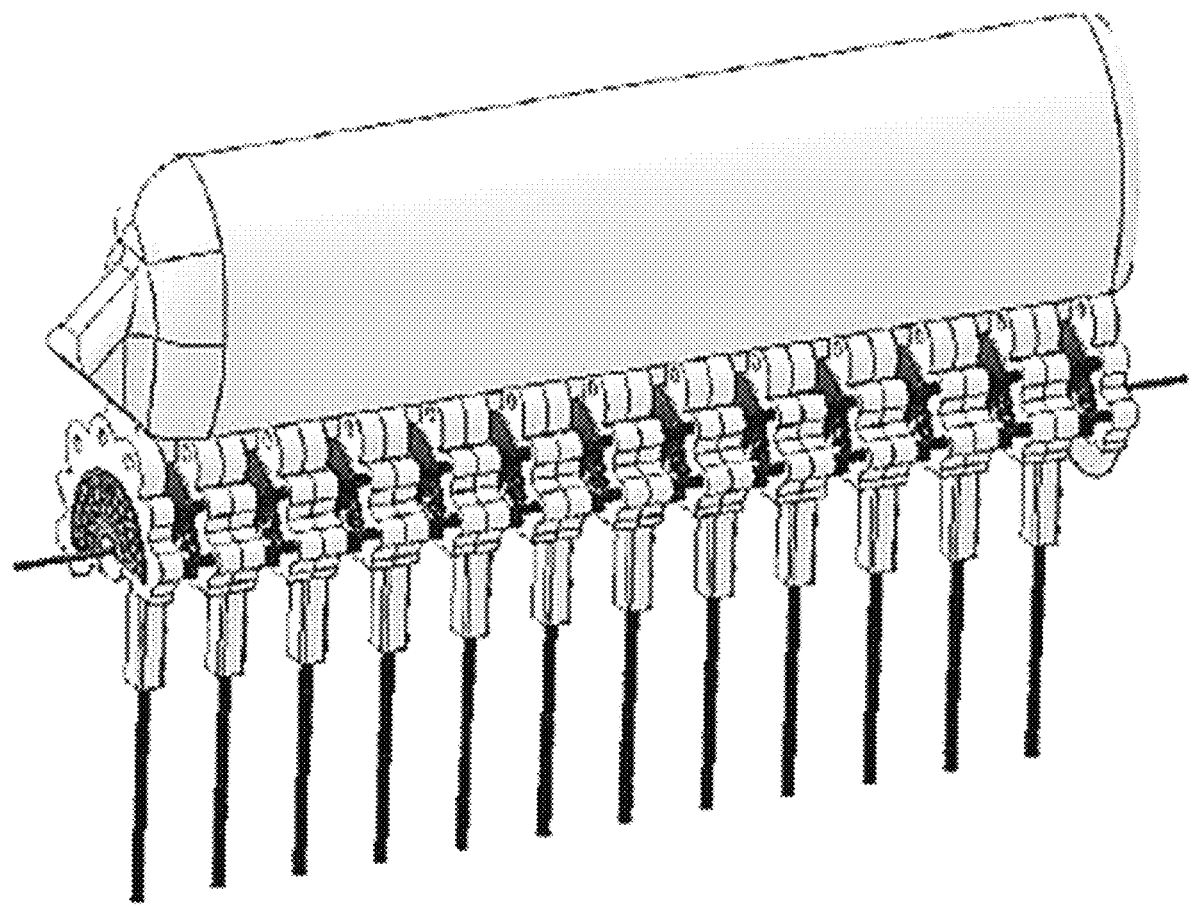
FIG. 7 shows yet another embodiment of the present disclosure in Flapping Fin AUV with stacked configuration for actuating multiple fin rays.
Figure 8:
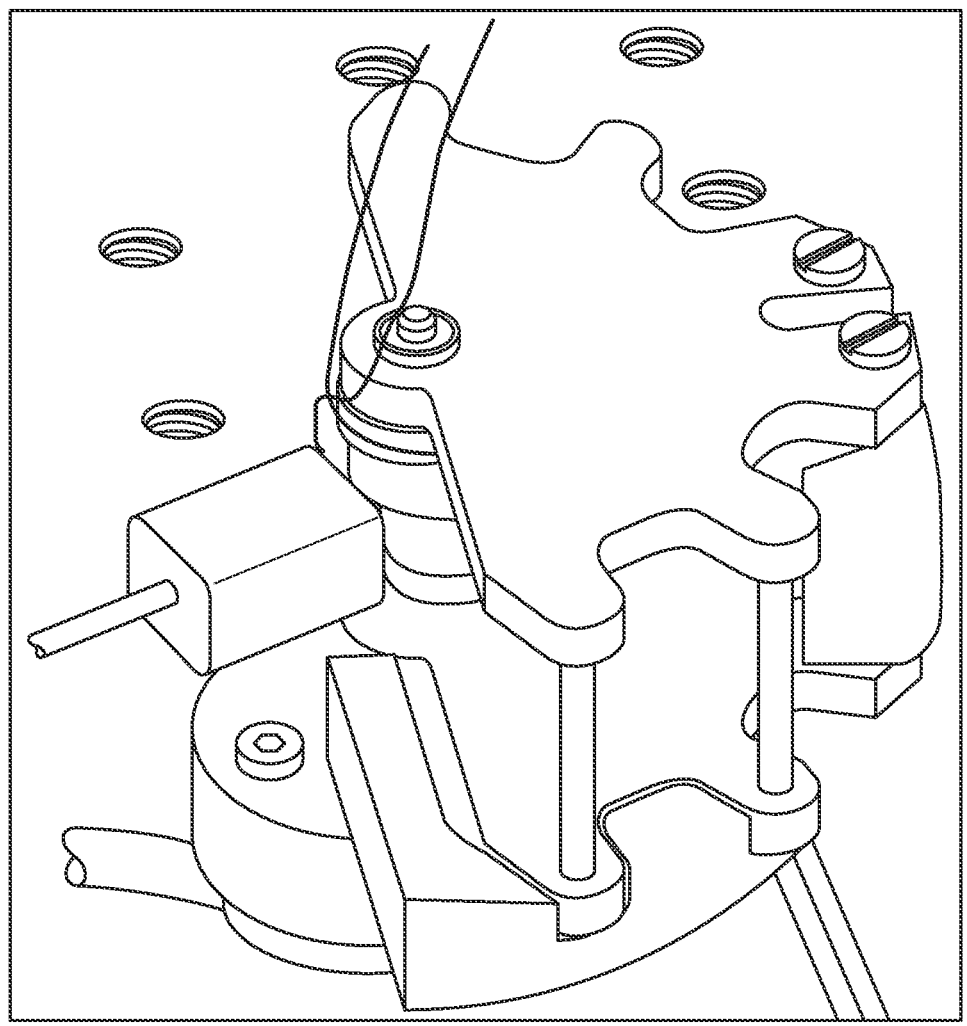
FIG. 8 shows the prototype built and tested according to the design described by FIGS. 2A and 2B.

Several modifications to the linkage system have been proposed and tested in previous studies that result in efficiency improvements. In the Nanohummingbird, the linkage was replaced by strings with negligible mass, therefore, reduced the inertial loss on transmission and the parasite structural vibrations. In this disclosure, to avoid the drawbacks of linkage mechanisms while at the same time to achieve a resonant system, this invention is a synergetic integration of novel voice coil motor, spring energy storage element, and wing/fin system. The overall flapper is optimized for generating reciprocating flapping motion at different scale for different applications. For energy efficiency and to achieve a resonant system, we directly drive the flapping wing/fin coupled with spring element. The spring element can be a torsional spring around a shaft or a flexible hinge design with spring and shaft combined into a flexure. As shown in FIGS. 1A, 1B, 2A, and 2B, one embodiment of the herein disclosed device and system includes a stator 102, which includes at least one yoke, four or two permanent magnets 104, a rotor 106 coupled to a coil 108, an appendage 112, and a spring element 110. The stator 102 is on top 102a and bottom 102b of the permanent magnets 104 and flapper to serve a shielding function and to guide the flow of the magnetic flux for enhancing torque generation. The magnets are arranged in such a way to let the magnetic flux flow in the pattern shown in FIG. 3 left image, thus when a potential difference is applied across the leads of the coil 108, the magnetic forces are shown in FIG. 3 right image with an arrow showing a driving torque generated acting upon the rotor 106 to flap the wing in one direction. Similarly when the voltage thus current direction switched, the torque direction switches to flap the wing in the other direction. Consequently, the switching of voltage input to the leads produces reciprocating torque, and thus a flapping motion. In the meantime, referring to FIG. 1B, the spring element 110, which can be either in the form of a torsion spring coupled to a rotating shaft or simply in the form of a flexible hinge with leaf spring (for example, blue steel) can be used to create the resonance for efficiently generating the flapping motion with the appendage 112. Referring to FIG. 4, the magnetic circuit design with finite element magnetic simulation shows the flux direction generated by the magnets' polarity arrangement. FIG. 5 shows an embodiment of the present disclosure in the form of a flapping wing micro air vehicle. FIG. 6 shows another embodiment of the present disclosure as a flapping fin autonomous underwater vehicle (AUV) with pectoral and tail fin actuated. FIG. 7 shows yet another embodiment of the present disclosure as a flapping fin autonomous underwater vehicle (AUV) with a stacked configuration for actuating multiple fin rays. In the stacked configuration, only two yokes 102a and 102b are used for the left-most and right-most actuator, thus the power density of the stacked actuator compound is greatly increased due to the elimination of intermediate yokes, while the other performances are maintained. FIG. 8 shows the prototype built and tested as shown in FIG. 2A and FIG. 2B. For purposes of this disclosure, an appendage can include a wing, a fin, and/or a limb, which can further include an arm or a leg.

In another embodiment, in the actuator, the plurality of permanent magnets 104 includes two permanent magnets 104, and wherein a first permanent magnet 104 is coupled to a first yoke and the second permanent magnet 104 is coupled to a second yoke. In yet another embodiment, the plurality of permanent magnets 104 can include one permanent magnet 104, wherein the permanent magnet 104 has reverse polarity at two ends, and a yoke on the opposite of the permanent magnet 104 to return the magnetic flux. In yet another embodiment, the permanent magnet is coupled to a yoke.

In yet another embodiment, the plurality of permanent magnets 104 includes four permanent magnets 104, and wherein two permanent magnets 104 are coupled to a first yoke and the other two permanent magnets 104 are coupled to a second yoke. In yet another embodiment includes multiple permanent magnets 104.

In yet another embodiment, the optional spring element includes a spring coupled to a rotating shaft. In yet another embodiment, the optional spring element 110 includes a spring coupled to a translating shaft. In yet another embodiment, the optional spring element 110 includes a flexible hinge with a leaf spring, and is configured to create resonance for efficiently generating a reciprocating motion for the appendage 112. In yet another embodiment, the appendage 112 includes at least one wing. In yet another embodiment, the appendage 112 includes at least one fin. In yet another embodiment, the appendage 112 includes at least one limb.

In yet another embodiment at least one rotor 106 and the at least one permanent magnet 104 are configured in a side-by-side alternating configuration. In yet another embodiment, the at least two yokes are on outer ends of the actuator's side-by-side alternating configuration.

In another aspect, a vehicle system is presented, which includes a navigation system, a battery and power system, an actuator system, at least one sensor for navigation, and at least one sensor for acquiring information from surroundings. The actuator system includes a stator 102 that includes at least one yoke, at least one permanent magnet 104, wherein the at least one permanent magnet 104 is coupled to the stator 102, at least one rotor, the rotor 106 comprises at least one coil winding 108, wherein the rotor 106 is moving within the magnetic field(s) generated by the permanent magnets 104, at least one appendage 112, wherein the at least one appendage 112 is coupled to the rotor 106; and an optional spring element 110, wherein the optional spring element 110 is coupled between the rotor 106 and the stator 102.

In another embodiment, in the actuator, the plurality of permanent magnets 104 includes two permanent magnets 104, and wherein a first permanent magnet 104 is coupled to a first yoke and the second permanent magnet 104 is coupled to a second yoke. In yet another embodiment, the plurality of permanent magnets 104 can include one permanent magnet 104, wherein the permanent magnet 104 has reverse polarity at two ends, and a yoke on the opposite of the permanent magnet 104 to return the magnetic flux. In yet another embodiment, the permanent magnet is coupled to a yoke.

In yet another embodiment, the plurality of permanent magnets 104 includes four permanent magnets 104, and wherein two permanent magnets 104 are coupled to a first yoke and the other two permanent magnets 104 are coupled to a second yoke. In yet another embodiment includes multiple permanent magnets 104.

In yet another embodiment, the optional spring element includes a spring coupled to a rotating shaft. In yet another embodiment, the optional spring element 110 includes a spring coupled to a translating shaft. In yet another embodiment, the optional spring element 110 includes a flexible hinge with a leaf spring, and is configured to create resonance for efficiently generating a reciprocating motion for the appendage 112. In yet another embodiment, the appendage 112 includes at least one wing. In yet another embodiment, the appendage 112 includes at least one fin. In yet another embodiment, the appendage 112 includes at least one limb.

In yet another embodiment at least one rotor 106 and the at least one permanent magnet 104 are configured in a side-by-side alternating configuration. In yet another embodiment, the at least two yokes are on outer ends of the actuator's side-by-side alternating configuration.

For a flapping fin autonomous underwater vehicle, in terms of actuation method, as previous devices mostly focus on hydrodynamic study or locomotion kinematics realization, a traditional servo motor is used herein. Also, novel actuations using artificial muscles are also yet another embodiment of this disclosure. But most artificial muscle is still in preliminary stage and several drawbacks preventing their successful adaptation. PZT has high power density and requires high voltage to operate and the small displacement needs mechanical amplification, so the overall system becomes very complicated. SMA has high force but the efficiency is very low and the actuation speed is very slow. IMPC have decent speed and low voltage but force is very limited. In terms of overall performance, electromagnetics still remain the closest resemblance in performance to the biological muscle system. All previous efforts have laid a solid foundation to fill the gap between the performances of the current manmade system and its biology counterparts. To further improve the performance of the herein described system, a new actuator has been optimized for the oscillatory motion of the biological locomotion. The performance of the flapping hydrofoil system is as the combination of the foil, actuator, and power electronics. The hydrodynamic performance of the foil is already shown to be better than the traditional screw propeller system, but the tradition way of realization of the locomotion limit the overall performance of the system in terms of efficiency, force density, power density and back-drivability. For example, the actuating motors work in an oscillation condition, which determines that the peak power is 40% higher than that in uniform rotation in order to achieve similar power output. As a result, the actuating motor and amplifier have to possess higher power redundancy, thus reducing the power density of the propeller. Working in an oscillation condition also prevents the actuating motors and reducer from working continuously at optimum efficiency points. Both electromechanical conversion efficiency and transmission efficiency of the caudal fin thruster are lower than that of a screw propeller, which works in uniform rotation. So a specialized oscillating actuator optimized for specific flapping or oscillating kinematics and its fluid dynamics can be designed in order to tap into the high performance of the overall system. Advantages of the herein disclosed design include high frequency for less recoil motion, less induced vibration, small wing/fin, high efficiency, direct drive, better back-drivability and low impedance, resonant drive, recover potential energy, low voltage (3.7V LiPo battery), low cost, small size, scalability, better manufacturability and low noise.

Flapping wing micro air vehicles and flapping fin autonomous underwater vehicle offer superior maneuverability and response over traditional fixed wing or rotorcraft air vehicles and rotary propeller under water vehicle. They offer wide range of applications in environmental monitoring, conducting reconnaissance, surveillance, and search and rescue in confined or limited spaces. Additionally, the invention described herein offers less noise and higher efficiency compared to the traditional highly geared servo motor drive. This is vital for reducing the environmental impact during environmental monitoring and increase the stealth during reconnaissance.

Those skilled in the art will recognize that numerous modifications can be made to the specific implementations described above. The implementations should not be limited to the particular limitations described. Other implementations may be possible.

The invention claimed is:

1. An actuator, comprising:
a stator comprising at least one yoke;
at least one permanent magnet, wherein the at least one permanent magnet is coupled to the stator;
at least one rotor, the rotor comprises at least one coil winding, wherein the rotor is moving within the magnetic field(s) generated by the permanent magnets, wherein the at least one rotor is above the stator;
at least one appendage, wherein the at least one appendage is coupled to the rotor;
a spring element, wherein the spring element is coupled between the rotor and the stator,
a second stator, wherein the second stator is over the at least one rotor; and
a support connecting the stator and the second stator, wherein the support is configured to limit a range of rotation of the at least one rotor.

2. The actuator of claim 1, wherein the at least one permanent magnet comprises two permanent magnets, and wherein a first permanent magnet is coupled to a first yoke and the second permanent magnet is coupled to a second yoke.

3. The actuator of claim 1, wherein the at least one permanent magnet comprises one permanent magnet, and wherein the permanent magnet has reverse polarity at two ends, and a yoke on the opposite of the one permanent magnet to return the magnetic flux.

4. The actuator of claim 3, wherein the one permanent magnet is coupled to the yoke.

5. The actuator of claim 1, wherein the at least one permanent magnet comprises four permanent magnets, and wherein two permanent magnets are coupled to a first yoke and the other two permanent magnets are coupled to a second yoke.

6. The actuator of claim 1, wherein the at least one permanent magnet comprises multiple permanent magnets.

7. The actuator of claim 1, wherein the at least one permanent magnet comprises multiple permanent magnets.

8. The actuator of claim 1, wherein the optional spring element comprises a spring coupled to a rotating shaft.

9. The actuator of claim 1, wherein the optional spring element comprises a spring coupled to a translating shaft.

10. The actuator of claim 1, wherein the spring element comprises a flexible hinge with a leaf spring, and is configured to create resonance for efficiently generating a reciprocating motion for the appendage.

11. The actuator of claim 1, wherein the appendage comprises at least one wing.

12. The actuator of claim 1, wherein the appendage comprises at least one fin.

13. The actuator of claim 1, wherein the appendage comprises at least one limb.

14. The actuator of claim 1, wherein the at least one rotor and the at least one permanent magnet are configured in a side-by-side alternating configuration.

15. The actuator of claim 14, wherein the at least two yokes are on outer ends of the actuator's side-by-side alternating configuration.

16. A vehicle system, comprising:
a navigation system;
a battery and power system;
an actuator system, wherein the actuator system comprises:
  a stator comprising at least one yoke;
  at least one permanent magnet, wherein the at least one permanent magnet is coupled to the stator;
  at least one rotor, the rotor comprises at least one coil winding, wherein the rotor is moving within the magnetic field(s) generated by the permanent magnets, wherein the rotor is over the at least one stator;
  at least one appendage, wherein the at least one appendage is coupled to the rotor;
  a spring element, wherein the spring element is coupled between the rotor and the stator; and
  a second stator, wherein the second stator is over the at least one rotor;
at least one sensor for navigation;
  at least one sensor for acquiring information from surroundings; and
  a support connecting the stator and the second stator, wherein the support is configured to limit a range of rotation of the at least one rotor.

17. The vehicle of claim 16, wherein the at least one permanent magnet comprises two permanent magnets, and wherein a first permanent magnet is coupled to a first yoke and the second permanent magnet is coupled to a second yoke.

18. The vehicle of claim 16, wherein the at least one permanent magnet comprises one permanent magnet, and wherein the one permanent magnet has reverse polarity at two ends, and a yoke on the opposite of the one permanent magnet to return the magnetic flux.

19. The actuator of claim 18, wherein the one permanent magnet is coupled to a yoke.

20. The vehicle of claim 18, wherein the at least one permanent magnet comprises multiple permanent magnets.

21. The vehicle of claim 16, wherein the at least one permanent magnet comprises four permanent magnets, and wherein two permanent magnets are coupled to a first yoke and the other two permanent magnets are coupled to a second yoke.

22. The vehicle of claim 16, wherein the at least one permanent magnet comprises multiple permanent magnets.

23. The vehicle of claim 16, wherein the spring element comprises a spring coupled to a rotating shaft.

24. The vehicle of claim 16, wherein the spring element comprises a spring coupled to a translating shaft.

25. The vehicle of claim 16, wherein the optional spring element comprises a flexible hinge with a leaf spring, and is configured to create resonance for efficiently generating a reciprocating motion for the appendage.

26. The vehicle of claim 16, wherein the appendage comprises at least one wing.

27. The vehicle of claim 16, wherein the appendage comprises at least one fin.

28. The vehicle of claim 16, wherein the appendage comprises at least one limb.

29. The vehicle of claim 16, wherein the at least one rotor and the at least one permanent magnet are configured in a side-by-side alternating configuration.

30. The vehicle of claim 29, wherein the at least two yokes are on outer ends of the actuator system.

* * * * *